United States Patent
Han et al.

(10) Patent No.: US 11,355,018 B2
(45) Date of Patent: Jun. 7, 2022

(54) METHOD AND APPARATUS FOR FLIGHT PATH INFORMATION REPORTING

(71) Applicant: LENOVO (BEIJING) LIMITED, Beijing (CN)

(72) Inventors: Jing Han, Beijing (CN); Haiming Wang, Beijing (CN); Lianhai Wu, Beijing (CN); Zhuoyun Zhang, Beijing (CN); Xiaodong Yu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/055,283

(22) PCT Filed: May 14, 2018

(86) PCT No.: PCT/CN2018/086695
§ 371 (c)(1),
(2) Date: Nov. 13, 2020

(87) PCT Pub. No.: WO2019/218114
PCT Pub. Date: Nov. 21, 2019

(65) Prior Publication Data
US 2021/0201685 A1    Jul. 1, 2021

(51) Int. Cl.
*G08G 5/00* (2006.01)

(52) U.S. Cl.
CPC ......... *G08G 5/0013* (2013.01); *G08G 5/0026* (2013.01); *G08G 5/0069* (2013.01); *G08G 5/0082* (2013.01)

(58) Field of Classification Search
None
See application file for complete search history.

(56) References Cited

U.S. PATENT DOCUMENTS

| | | | |
|---|---|---|---|
| 2010/0149019 A1 | 6/2010 | Smith et al. | |
| 2013/0060466 A1* | 3/2013 | Gurusamy | G01C 23/005 701/465 |
| 2018/0037320 A1* | 2/2018 | Ko | B64C 39/024 |
| 2018/0118376 A1* | 5/2018 | Ehrstein | G07C 5/0808 |
| 2019/0027048 A1* | 1/2019 | Smith | G01S 17/933 |
| 2019/0213892 A1* | 7/2019 | Schwindt | G01S 5/0231 |
| 2020/0033848 A1* | 1/2020 | Zach | G08G 5/0034 |

FOREIGN PATENT DOCUMENTS

| | | |
|---|---|---|
| CN | 105225540 A | 1/2016 |
| CN | 106741890 A | 5/2017 |
| CN | 107272028 A | 10/2017 |

OTHER PUBLICATIONS

PCT/CN2018/086695, "International Search Report and the Written Opinion of the International Search Authority" ISA/CN, State Intellectual Property Office of the P.R. China, dated Jan. 30, 2019, pp. 1-9.

* cited by examiner

*Primary Examiner* — Brent Swarthout
(74) *Attorney, Agent, or Firm* — Kunzler Bean & Adamson

(57) ABSTRACT

Method and apparatus for flight path information reporting are disclosed. One method of UE such as aerial vehicles for flight path information reporting includes determining whether current flight path information is changed comparing with planned flight path information; and transmitting a report including the current flight path information to a network equipment such as eNB. The method contributes to improve mobility performance of the aerial vehicles by timely communicating the current flight path information.

19 Claims, 5 Drawing Sheets

METHOD AND APPARATUS FOR FLIGHT PATH INFORMATION REPORTING

FIELD

The subject matter disclosed herein relates generally to wireless communication and more particularly relates to flight path information reporting.

BACKGROUND

The following abbreviations and acronyms are herewith defined, at least some of which are referred to within the following description.

Third Generation Partnership Project ("3GPP"), Downlink ("DL"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Global Navigation Satellite System ("GNSS"), Information Element ("IE"), Light Detection And Ranging ("LiDAR"), Long Term Evolution ("LTE"), LTE Advanced ("LTE-A"), Master Information Block ("MIB"), Machine Type Communication ("MTC"), Radio Resource Control ("RRC"), Resource Reservation Field ("RRF"), Receive ("RX"), System Information Block ("SIB"), Time Division Duplex ("TDD"), Time-Division Multiplexing ("TDM"), Transmit ("TX"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X").

There have been an increased interests in communications between aerial vehicles such as drones and cellular networks. The use cases of commercial drones include package delivery, search-and-rescue, monitoring of critical infrastructure, wildlife conservation, flying cameras, and surveillance. All these use cases are growing rapidly and expected to emerge more in coming years. Many of these use cases could benefit from communications between drones as UEs and a cellular network. LTE and/or next generation thereof, which is known as 5G, are well positioned to serve aerial vehicles such as drones. In fact, there have been increased field trials involving using a LTE network to provide connectivity to drones. It is predicted that a rapid and vast growth in the drone industry will bring promising business opportunities to wireless operators. To meet the market demands, a new work item referred as "New WID (Working Item Description) on Enhanced LTE Support for Aerial Vehicles" has been approved by 3GPP. Particularly, enhancements to the existing measurement reporting mechanisms are required, including enhancements on trigger conditions for measurement report.

In another aspect, aerial vehicles are usually equipped with barometer, ultrasonic wave sensor, etc., and/or antennas for GNSS. The aerial vehicles can measure height thereof based on sea level, as well as height thereof as respect to a take-off point, with these equipments. Besides, ground height of the aerial vehicle is also required, for example, in order to provide an accurate flight path. Aerial vehicles with millimeter-wave radar or LiDAR can measure ground height thereof. However, there are still a few of aerial vehicles without such expensive radars, especially the aerial vehicles in middle-range or low end. Furthermore, ground height may vary in different areas, which are usually covered by different wireless cells. Thus, it is possible for wireless network equipments such as eNB to assist in the ground height measurement for the aerial vehicles.

BRIEF SUMMARY

Flight path plan can be used to improve mobility performance of the aerial vehicles, which requires that the aerial vehicles transmit a measurement report for the flight path information to the network equipment such as eNB. eNB can then assist in the mobility management for the aerial vehicles with the received flight path information, such as optimization in handover performance. However, in the case that the flight path information of the aerial vehicle is changed against the planned flight path information reported previously, the eNB may result in worse mobility management. Thus, it is required for the aerial vehicles to timely transmit the current flight path information.

In another aspect, the knowledge of the transmission for flight path information report, which is also referred as the flight path information reporting status, should be consistent between the aerial vehicle and the eNB. Otherwise, the eNB may determine that the request for flight path information is not received by the aerial vehicle, or the report for the flight path information is not received by itself. That is, it is required for the aerial vehicles to communicate with the eNB whether the flight path information will be transmitted.

In another aspect, the ground height of the aerial vehicle is required, for example, in order to provide an accurate flight path. Thus it is required for the eNB to transmit the ground height thereof to the aerial vehicles in order to calculate the ground height of the aerial vehicles by themselves.

Method and apparatus for flight path information reporting are disclosed. One method of UE such as aerial vehicles for flight path information reporting includes determining whether current flight path information is changed comparing with planned flight path information; and transmitting a report including the current flight path information to a network equipment such as eNB.

Further, the method of UE includes receiving a measurement configuration from the network equipment, which includes a condition used to determine whether the current flight path information is changed comparing with the planned flight path information.

Further, the method of UE includes receiving broadcast information and/or a RRC message from the network equipment, which indicates the network equipment's ground height based on sea level; and calculating a ground height based on the network equipment's ground height.

Further, the method of UE includes transmitting a flight path information reporting status to the network equipment which indicates whether to transmit the report including the flight path information.

The method and apparatus herein not only provide a mechanism that the UE such as aerial vehicles communicates with the network equipment such as eNB about the current flight path information against the planned flight path information, but also realize a consistence for the knowledge of flight path information transmission between the aerial vehicle and the eNB. Further, with the assistance from the eNB, the aerial vehicles can obtain the ground height thereof without the equipment such as the expensive radars. Thus, the method and apparatus herein contribute to enhancements on measurement reporting as well as cost reduction of the aerial vehicles.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1:
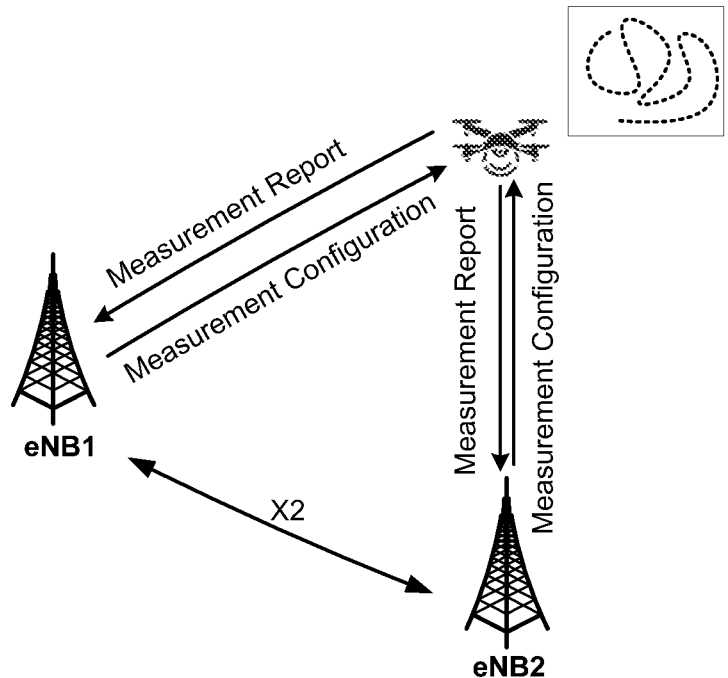
FIG. 1 is a schematic diagram illustrating measurement report transmission from an aerial vehicle.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred to hereafter as code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements on a mechanism for measurement report transmission from aerial vehicles should be studied to timely notify the network equipment such as eNB about the current flight path information, in order to enable efficient mobility management for the aerial vehicles. The flight path information includes but are not limited to a take-off location, a landing location, a flight path, a flight direction, intermediate locations along the flight path and/or planned time for arriving at the intermediate locations. The measurement report transmission can be determined by the aerial vehicle. In one embodiment, the eNB may transmit a measurement configuration which includes a condition used by the aerial vehicle to determine whether the current flight path information is changed comparing with the planned flight path information. In another embodiment, the aerial vehicle may periodically transmit the measurement report and include the current flight path information into the measurement report for the next cycle. In yet another embodiment, the aerial vehicle may transmit the measurement report based on an event, and then include the current flight path information into the measurement report in the case that the aerial vehicle discovers the flight path information is changed. It should be understood that the flight path information can be included in another report other than the measurement report to the eNB, and/or in a RRC message/signaling on UL.

In another aspect, the flight path information reporting status, which indicates whether to transmit the measurement report or whether the flight path information exists for the aerial vehicle, is notified by the aerial vehicle to the network such as eNB, in order to avoid the inconsistence with regard to the transmission/reception of the measurement report between the aerial vehicle and eNB.

In another aspect, the ground height is calculated by the aerial vehicles based on the received ground height of eNB as well as a measured sea level. In one embodiment, the locations of the aerial vehicles along the flight path includes the latitude, the longitude, and the ground height thereof.

It should be understood that the enhancements on the trigger conditions for the measurement report, the consistence for the transmission of the measurement report, and the ground height calculation can be conducted independently, or in combination, which is described in details hereinafter.

FIG. 1 is a schematic diagram illustrating measurement report transmission from an aerial vehicle. As shown in FIG. 1, an aerial vehicle transmits a measurement report to eNB (for example, eNB1 or eNB2). In one embodiment, the trigger conditions for the transmission of the measurement report is included in the measurement configuration IE of a RRC message such as RRCConnectionSetup from the eNB. In the case that the trigger condition is met, the aerial vehicle transmits the measurement report to the eNB. In another embodiment, the aerial vehicle periodically transmit the measurement report according to the measurement configuration from the eNB.

In another aspect, the flight path information are notified from eNB1 to eNB2 over X2 interface, in the case that the handover for the aerial vehicle is conducted.

The flight path information includes but are not limited to a take-off location, a landing location, a flight path, a flight direction, intermediate locations along the flight path and/or planned time for arriving at the intermediate locations. In one embodiment, the locations along the flight path, such as take-off location, a landing location and intermediate locations, include the latitude, the longitude and the ground height.

Figure 2:
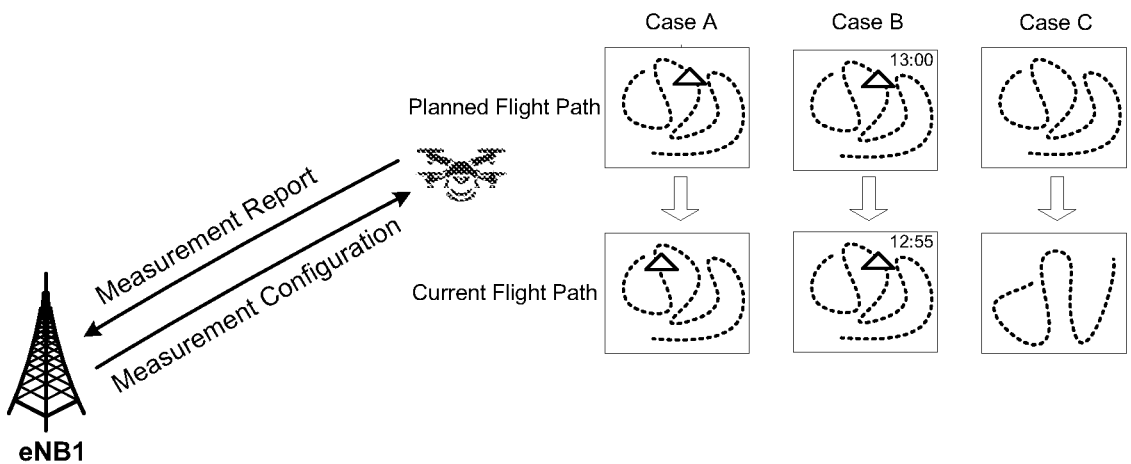
FIG. 2 is a schematic diagram illustrating measurement report transmission from an aerial vehicle in the case that flight path information is changed.

FIG. 2 is a schematic diagram illustrating measurement report transmission from an aerial vehicle in the case that flight path information is changed. As shown in FIG. 2, the determination of flight path information being changed includes but are not limited to the following three cases.

Case A: Whether or not a location difference between a current location and a planned location is larger than a first threshold within a time window, length of which is pre-configured. In a particular embodiment, the length of the time window is 0, i.e. a time point. The location difference may be calculated with an algorithm relating to a three-dimensional (3D) position. In the case that the location difference is less than the first threshold, the aerial vehicle will not transmit the measurement report including the current flight path information. Otherwise in the case that the location difference is larger than the first threshold, the aerial vehicle will transmit the measurement report including the current flight path information to the eNB. The first threshold and/or the length of the time window can be indicated by the eNB in a RRC message including measurement configuration, which will be described in details hereinafter.

Case B: Whether or not a time difference between an actual time and a planned time for arriving at a location is larger than a second threshold. As shown in FIG. 2, with regard to a certain location, assuming the planned arriving time is 13:00 while the current arriving time is 12:55, and the second threshold is 4 minutes, that is, the time difference is 5 minutes which is larger than the second threshold of 4 minutes. Then the aerial vehicles will transmit the measurement report including the current flight path information to the eNB. The second threshold can be indicated by the eNB in a RRC message including measurement configuration, which will be described in details hereinafter.

Case C: Whether or not the current flight path information is changed comparing with the planned flight path information. In one embodiment, a determination that one or more of the flight path information, for example, a landing location, flight direct, intermediate locations along the flight path, etc., is changed, will trigger the measurement report transmission from the aerial vehicle.

The RRC message including an IE of the measurement configuration may be a new RRC message, or a legacy RRC message including but not limited to RRCConnectionSetup, RRCConnectionReconfiguration, RRCConnectionReestablishment, etc. Further, the measurement configuration IE may contain a measurement event to indicate the conditions for determining whether the current flight path information is changed against the planned path information.

Figure 3:
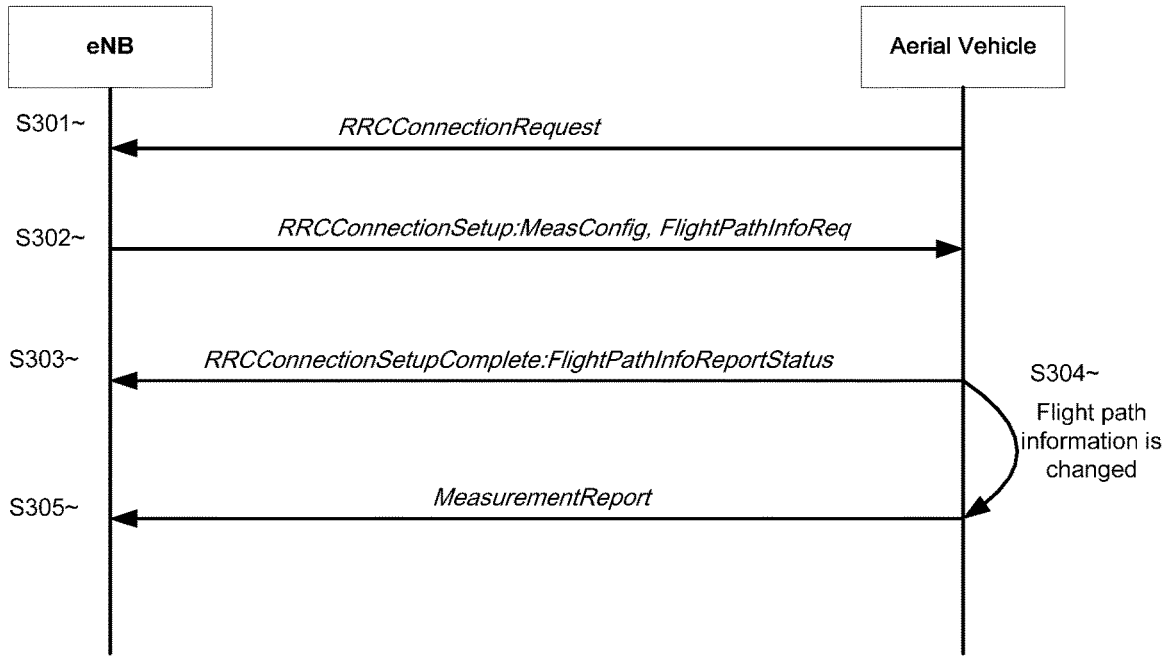
FIG. 3 is a call flow illustrating that transmission of measurement report including the current flight path information according to the first embodiment.

FIG. 3 is a call flow illustrating that transmission of measurement report including the current flight path information according to the first embodiment. As shown in FIG. 3, the aerial vehicle learns the measurement configuration and notifies the flight path information reporting status in the procedure of RRC connection setup.

In step S301, the aerial vehicle transmits a RRCConnectionSetupRequest message to the eNB for requesting a RRC connection.

In step S302, the eNB transmits a RRCConnectionSetup message to the aerial vehicle in response to the received RRCConnectionSetup message. In one embodiment, the measurement configuration IE (MeasConfig in FIG. 3) is included in the RRCConnectionSetup message, for example, to indicate a condition for determining whether the flight path information is changed with a measurement event. In another embodiment, an IE for requesting the measurement report including the flight path information (FlightPathInfoReq in FIG. 3) is included in the RRCConnectionSetup message.

In step S303, the aerial vehicle transmits a RRCConnectionSetupComplete message to eNB, that is, the RRC connection is established. The flight path information reporting status (FlightPathInfoReportStatus in FIG. 3) is set to be "true", to indicate to the eNB that the measurement report will be transmitted or the flight path information exists for the aerial vehicle. In one embodiment, the flight path information reporting status is transmitted in the RRCConnectionSetupComplete message as a piggyback. For example, 1 bit in the RRCConnecionSetupComplele message can be used for the flight path information reporting status. It is obviously that the aerial vehicle may set the flight path information reporting status to be "false", and in that case, there will be no measurement report including flight path information to be transmitted.

In step S304, the aerial vehicle determines whether the current flight path information is changed comparing with the planned flight path information with the received conditions from the eNB. In one embodiment, the determination of the current flight path information being changed is based on that a difference between a current location and a planned location being larger than a first threshold within a time window, and the difference can be calculated with an algorithm relating to a three-dimensional (3D) position. In another embodiment, the determination of the current flight path information being changed is based on that a difference between an actual time and a planned time for arriving at a location being larger than a second threshold. In yet another embodiment, the determination of the current flight path information being changed is based on an actual flight path being different with a planned flight path.

In the case that the current flight path information is determined to be changed, the aerial vehicle transmits the measurement report including the current flight path information in step S305.

It should be understood that the measurement configuration and/or the flight path information request may be not indicated by the eNB, and in that case, the aerial vehicle can still actively transmit the measurement report including the current flight path information. For example, the determination of the flight path information being changed may be based on the stored conditions by the aerial vehicles.

It should also be understood that the flight path information request may be not indicated by the eNB, and in that case, the aerial vehicle may or may not set the flight path information reporting status in a RRC message as a piggyback.

In one embodiment, the eNB can user a new RRC message to request the measurement report including the flight path information. Similarly, the aerial vehicle can also use another new RRC message to indicate whether the measurement report including the flight path information will be transmitted.

Figure 4:
FIG. 4 is a call flow illustrating that transmission of measurement report including the current flight path information according to the second embodiment.

FIG. 4 is a call flow illustrating that transmission of measurement report including the current flight path information according to the second embodiment. As shown in FIG. 4, the aerial vehicle learns the measurement configuration and notifies the flight path information reporting status in the procedure of RRC connection reconfiguration.

In step S401, the eNB transmits a RRCConnectionReconfguration message to the aerial vehicle to reconfigure an established RRC connection. Similar with the IEs in the RRCConnectionSetup message, the measurement configuration IE (MeasConfig in FIG. 4) is included in the RRCConnectionReconfiguration message, for example, to indicate a condition for determining whether the flight path information is changed with a measurement event. In another embodiment, an IE for requesting the measurement report including the flight path information (FlightPathnfoReq in FIG. 4) is included in the RRCConnectionReconfiguration message.

In step S402, the aerial vehicle transmits a RRCConnectionReconfgurationComplete message to eNB, that is, the reconfiguration for the established RRC connection is completed. Similar with the IEs in the RRCConnectionSetupComplete message, the flight path information reporting status (FlightPathfnfReportStatus in FIG. 4) is set to be "true", to indicate to the eNB that the measurement report will be transmitted or the flight path information exists for the aerial vehicle. In one embodiment, the flight path information reporting status is transmitted in the RRCConnectinReconfigurationComplete message as a piggyback. For example, 1 bit in the RRCCnnectionReconfigurationComplete message can be used for the flight path information reporting status. It is obviously that the aerial vehicle may set the flight path information reporting status to be "false", and in that case, there will be no measurement report including flight path information to be transmitted.

In step S403, the aerial vehicle determines whether the current flight path information is changed comparing with the planned flight path information with the received conditions from the eNB.

In the case that the current flight path information is determined to be changed, the aerial vehicle transmits the measurement report including the current flight path information in step S404.

Figure 5:
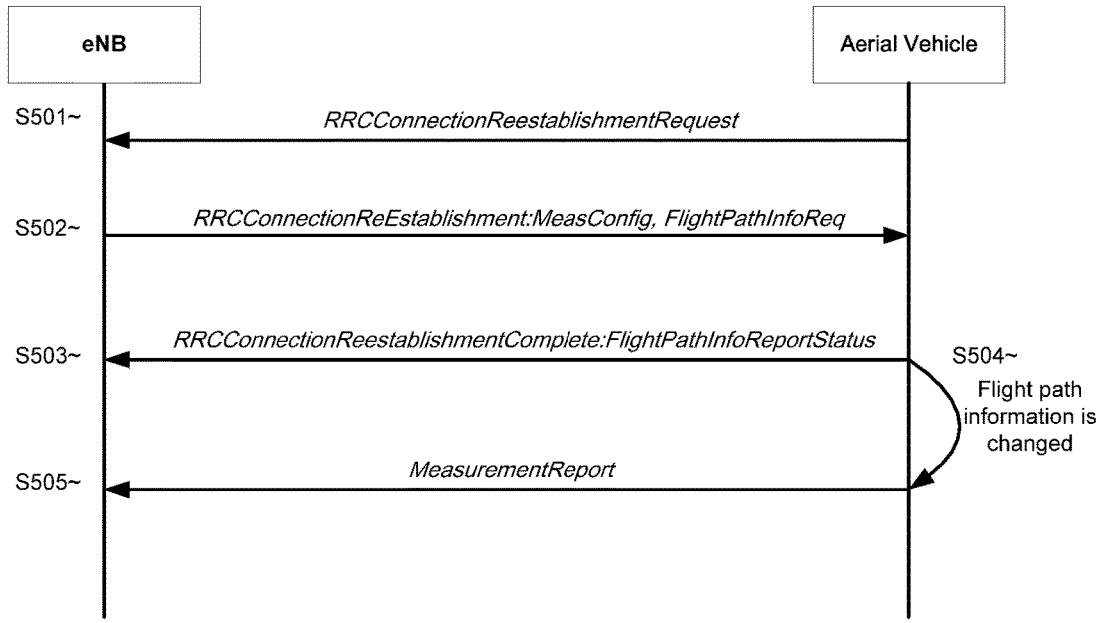
FIG. 5 is a call flow illustrating that transmission of measurement report including the current flight path information according to the third embodiment.

FIG. 5 is a call flow illustrating that transmission of measurement report including the current flight path information according to the third embodiment. As shown in FIG. 5, the aerial vehicle learns the measurement configuration and notifies the flight path information reporting status in the procedure of RRC connection reestablishment.

In step S501, the aerial vehicle transmits a RRCConnectionReestablishmentRequest message to the eNB for reestablishing an existing RRC connection. For example, in the ping-pong handover case that the existing RRC connection may be inactive before a timer expires, the UE such as aerial vehicle may attempt to reestablish the existing and inactive RRC connection with the eNB.

In step S502, the eNB transmits a RRCConnectionReestablishment message to the aerial vehicle to reconfigure an established RRC connection. Similar with the IEs in the RRCConnectionSetup message, the measurement configuration IE (MeasConfig in FIG. 5) is included in the RRCConnectionReestablishment message, for example, to indicate a condition for determining whether the flight path information is changed with a measurement event. In another embodiment, an IE for requesting the measurement report including the flight path information (FlightPathnfoReq in FIG. 4) is included in the RRCConnectionReestablishment message.

In step S503, the aerial vehicle transmits a RRCConnectionReestablishementComplete message to eNB, that is, the recover for the existing RRC connection is completed. Similar with the IEs in the RRCConnectionSelupComplete message, the flight path information reporting status (FlightPathnfoReportStatus in FIG. 5) is set to be "true", to indicate to the eNB that the measurement report will be transmitted or the flight path information exists for the aerial vehicle. In one embodiment, the flight path information reporting status is transmitted in the RRCConnectinReestablishementComplete message as a piggyback. For example, 1 bit in the RRCConnectionReestablishementComplete message can be used for the flight path information reporting status. It is obviously that the aerial vehicle may set the flight path information reporting status to be "false", and in that case, there will be no measurement report including flight path information to be transmitted.

In step S504, the aerial vehicle determines whether the current flight path information is changed comparing with the planned flight path information with the received conditions from the eNB.

In the case that the current flight path information is determined to be changed, the aerial vehicle transmits the measurement report including the current flight path information in step S505.

It should be understood that, besides the RRCConnectionsetupComplete message, RRCConnectionReconfigurationComplete message, RRCConnectionReestablishemeniComplete message and a new RRC message, the flight path information reporting status can also be included in but not limited to a RRCConnectionRequest message, a RRCConnectionReestablishmentRequest message, a MeasurementReport message and a UEAssistancenformation Message.

Figure 6:
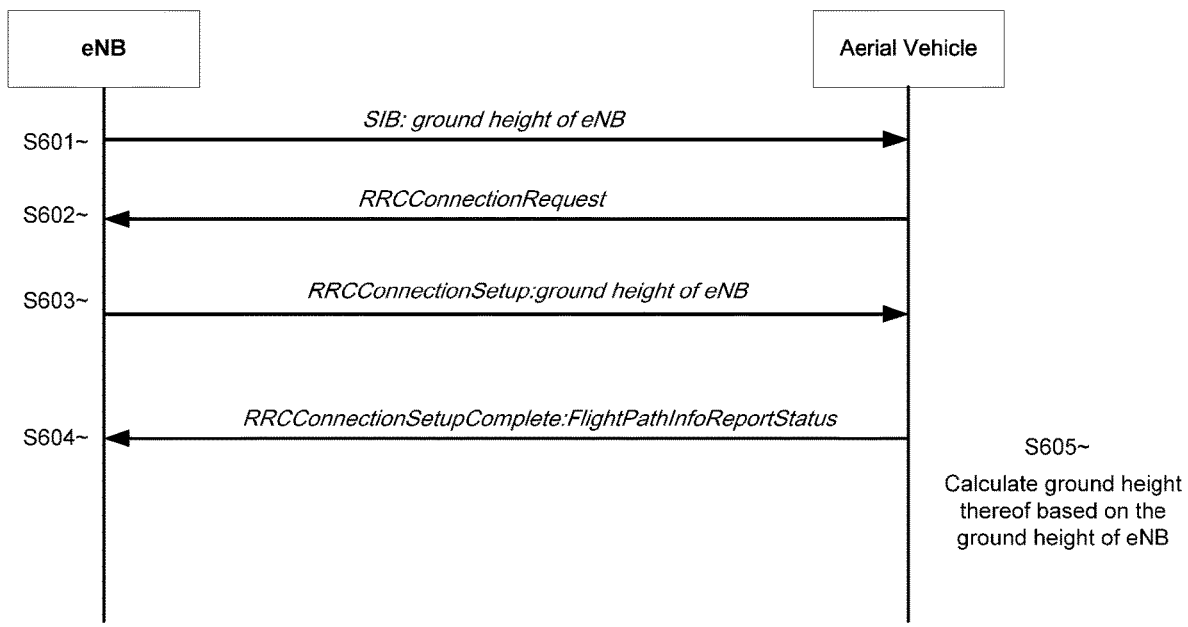
FIG. 6 is a call flow illustrating that transmission of ground height of eNB according to the fourth embodiment.

FIG. 6 is a call flow illustrating that transmission of ground height of eNB according to the fourth embodiment. As shown in FIG. 6, eNB assists in the calculation of the group height of the aerial vehicle by transmitting the ground height of the eNB.

In step S601, eNB transmits a broadcast information including its ground height, for example, based on a sea level. In one embodiment, the broadcast information including the ground height of the eNB includes but is not limited to MIB or SIB.

From step S602 to S604, a RRC connection is setup between the eNB and the aerial vehicle. Particularly, in step S603 that the eNB transmits the RRCConnectionSetpup message to the aerial vehicle, which may includes the ground height of eNB, for example, based on a sea level.

In step S605, the aerial vehicle calculate its ground height based on the received ground height of the eNB. For example, in the case that the ground height of the eNB is 50 meters above the sea level and the flight height of the aerial vehicle is 200 meters by measurement with an equipment such as barometer, ultrasonic wave sensor, then the ground height of the aerial vehicle can be calculated as 150 meter, i.e. a subtraction of the eNB's ground height from the aerial vehicle's flight height, both of which are based on a same level such as the sea level.

Optionally, the aerial vehicle can include its ground height into the flight path information and transmits the measurement report including its ground height afterwards.

It should be understood that, the eNB can transmit its ground height in one or more of the broadcast information such as SIB or MIB, a new RRC message and a legacy RRC message such as a message in the procedure of RRC connection setup, RRC connection reconfiguration or RRC connection reestablishment.

It should be noted that the implementation on the transmission of the measurement report including the current flight path information, the consistence for the transmission of the measurement report, and the ground height calculation can be conducted independently, or in combination.

Figure 7:
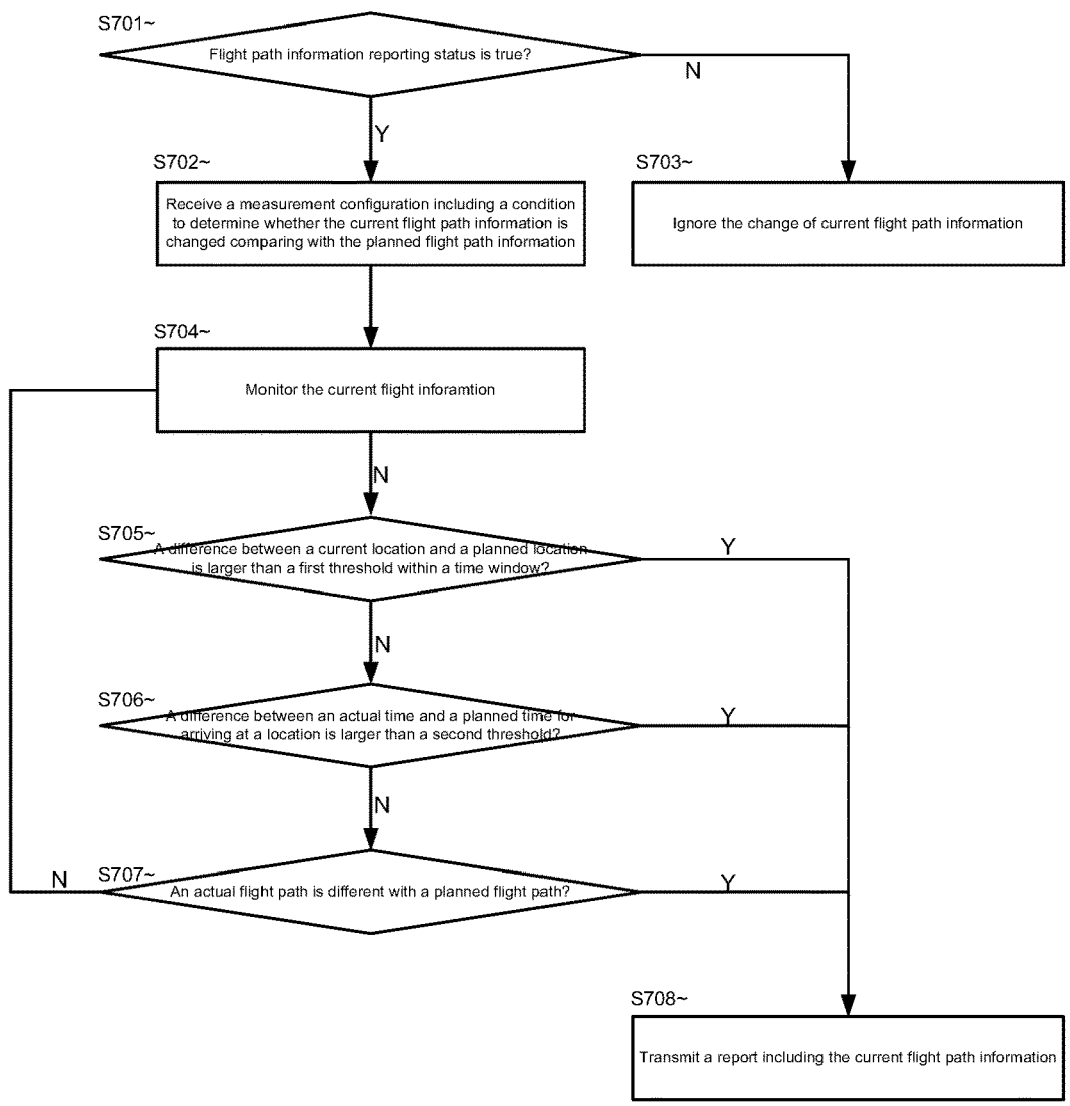
FIG. 7 is a process of an aerial vehicles for transmission of measurement reporting including the current flight path information.

FIG. 7 is a process of an aerial vehicles for transmission of measurement reporting including the current flight path information. As shown in FIG. 7, in step S701, the aerial vehicle determine whether the flight path information reporting status is true, that is, whether the flight path information will be transmitted. If it is true, the process continues to step S702. Otherwise, the process continues to step S703, in which the aerial will not transmit the report and ignore the change of the flight path information.

In step S703 that the aerial vehicle is to transmit the report including flight path information, the aerial vehicle performs a monitoring on the current flight path information.

In step S704, if the location difference between a current location and a planned location is larger than a first threshold within a time window, the aerial vehicle will transmit a report including flight path information in step S708. Otherwise if the location difference is less than the first threshold before the time window expires, the process continues to step S704 for monitoring the current flight path information. The length of the time window is pre-configured. In a particular embodiment, the length of the time window is 0, i.e. a time point.

In step S705, if the time difference between an actual time and a planned time for arriving at a location is larger than a second threshold, the aerial vehicle will transmit a report including flight path information in step S708. Otherwise if the time location difference is less than the second threshold, the process continues to step S704 for monitoring the current flight path information.

In step S706, if the actual flight path is different with a planned flight path, the aerial vehicle will transmit a report including flight path information in step S708. Otherwise if the flight path has not been changed, the process continues to step S704 for monitoring the current flight path information.

Figure 8:
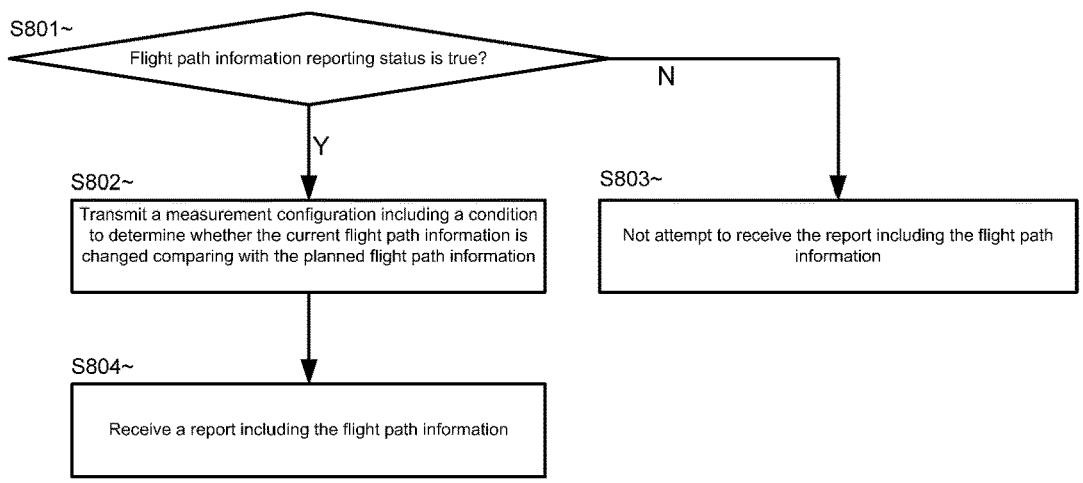
FIG. 8 is a process of an eNB for reception of measurement reporting including the current flight path information.

FIG. 8 is a process of an eNB for reception of measurement reporting including the current flight path information. As shown in FIG. 8, in step S801, in the case that the eNB receives a flight path information reporting status with a value of "true", which indicates the eNB will receives the report including the flight path information, the process continues to step S802. Otherwise, the process continues to step S803, in which the eNB does not attempt to receive the flight path information.

In step S802, the eNB may optionally transmit a measurement configuration including a condition to determine whether the current flight path information is changed comparing with the planned flight path information.

In step S803, the eNB may receive a report including the flight path information from the aerial vehicle.

One skilled in the relevant art will recognize, however, that the process described in FIGS. 7 and 8 need not necessarily be practiced in the sequence shown in the Figures, and are able to be practiced without one or more of the specific steps, or with other steps not shown in the Figures. In one embodiment, the sequence of steps S705-S707 can be changed. In another embodiment, Step S702 and/or step S802 can be omitted in the case that the trigger conditions for transmitting the flight plan information are pre-configured in the aerial vehicles.

Figure 9:
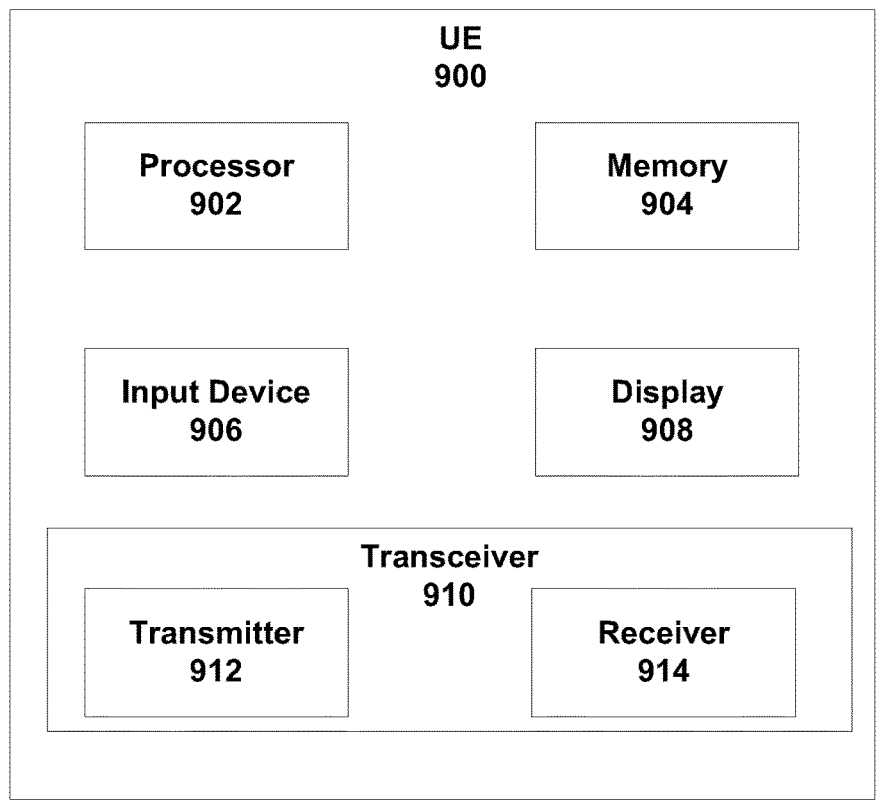
FIG. 9 is a schematic block diagram illustrating components of a UE such as aerial vehicle according to one embodiment.

FIG. 9 is a schematic block diagram illustrating components of a UE such as aerial vehicle according to one embodiment.

UE900 is an embodiment of the aerial vehicle described from FIG. 1 to FIG. 8. Furthermore, UE 900 may include a processor 902, a memory 904, and a transceiver 910. In some embodiments, UE 900 may include an input device 906 and/or a display 908. In certain embodiments, the input device 906 and the display 908 may be combined into a single device, such as a touch screen.

The processor 902, in one embodiment, may include any known controller capable of executing computer-readable instructions and/or capable of performing logical operations. For example, the processor 902 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 902 executes instructions stored in the memory 904 to perform the methods and routines described herein. The processor 902 is communicatively coupled to the memory 904, the input device 906, the display 908, and the transceiver 910.

In some embodiments, the processor 902 controls the transceiver 910 to transmit a measurement report including a flight path information to Network Equipment 1000 and/or receive a measurement configuration from Network Equipment 1000. In one embodiment, the processor 902 of UE may control the transceiver 910 to transmit a flight path information reporting status to Network Equipment 1000 indicating whether the report including a flight path information will be transmitted. In another embodiment, the processor 902 may control the transceiver 910 to receive a broadcast information and/or a RRC message including the ground height of Network Equipment 1000, as described above. In certain embodiments, the processor 902 may monitor DL signals received via the transceiver 910 for specific messages.

The memory 904, in one embodiment, is a computer readable storage medium. In some embodiments, the memory 904 includes volatile computer storage media. For example, the memory 904 may include a RAM, including dynamic RAM ("DRAM"), synchronous dynamic RAM ("SDRAM"), and/or static RAM ("SRAM"). In some embodiments, the memory 904 includes non-volatile computer storage media. For example, the memory 904 may include a hard disk drive, a flash memory, or any other suitable non-volatile computer storage device. In some embodiments, the memory 904 includes both volatile and non-volatile computer storage media. In some embodiments, the memory 904 stores data relating to trigger conditions for transmitting the report including flight path information received from Network Equipment 1000. In some embodiments, the memory 904 also stores program code and related data, such as an operating system or other controller algorithms operating on UE 900.

UE 900 may optionally include an input device 906. The input device 906, in one embodiment, may include any known computer input device including a touch panel, a button, a keyboard, a stylus, a microphone, or the like. In some embodiments, the input device 906 may be integrated with the display 908, for example, as a touch screen or similar touch-sensitive display. In some embodiments, the input device 906 includes a touch screen such that text may be input using a virtual keyboard displayed on the touch screen and/or by handwriting on the touch screen. In some embodiments, the input device 906 includes two or more different devices, such as a keyboard and a touch panel. In certain embodiments, the input device 906 may include one or more sensors for monitoring an environment of UE 900.

UE 900 may optionally include a display 908. The display 908, in one embodiment, may include any known electronically controllable display or display device. The display 908 may be designed to output visual, audible, and/or haptic signals. In some embodiments, the display 908 includes an electronic display capable of outputting visual data to a user. For example, the display 908 may include, but is not limited to, an LCD display, an LED display, an OLED display, a projector, or a similar display device capable of outputting images, text, or the like to a user. As another, non-limiting, example, the display 908 may include a wearable display such as a smart watch, smart glasses, a heads-up display, or the like. Further, the display 908 may be a component of a smart phone, a personal digital assistant, a television, a table computer, a notebook (laptop) computer, a personal computer, a vehicle dashboard, or the like.

In certain embodiments, the display 908 may include one or more speakers for producing sound. For example, the display 908 may produce an audible alert or notification (e.g., a beep or chime). In some embodiments, the display 908 includes one or more haptic devices for producing vibrations, motion, or other haptic feedback.

In some embodiments, all or portions of the display 908 may be integrated with the input device 906. For example, the input device 906 and display 908 may form a touch screen or similar touch-sensitive display. In other embodiments, the display 908 may be located near the input device 906.

The transceiver 910, in one embodiment, is configured to communicate wirelessly with Network Equipment 1000. In certain embodiments, the transceiver 910 comprises a transmitter 912 and a receiver 914. The transmitter 912 is used to transmit UL communication signals to Network Equipment 1200 and the receiver 914 is used to receive DL communication signals from Network Equipment 1200. For example, the transmitter 912 may transmit flight path information reporting status indicating whether to transmit the corresponding measurement report. As another example, the receiver 914 may receive trigger conditions for transmitting the current flight path information from Network Equipment 1000.

The transmitter 912 and the receiver 914 may be any suitable types of transmitters and receivers. Although only one transmitter 912 and one receiver 914 are illustrated, the transceiver 910 may have any suitable number of transmitters 912 and receivers 914. For example, in some embodiments, UE 900 includes a plurality of transmitter 912 and receiver 914 pairs for communicating on a plurality of wireless networks and/or radio frequency bands, each transmitter 912 and receiver 914 pair configured to communicate on a different wireless network and/or radio frequency band than the other transmitter 912 and receiver 914 pairs.

Figure 10:
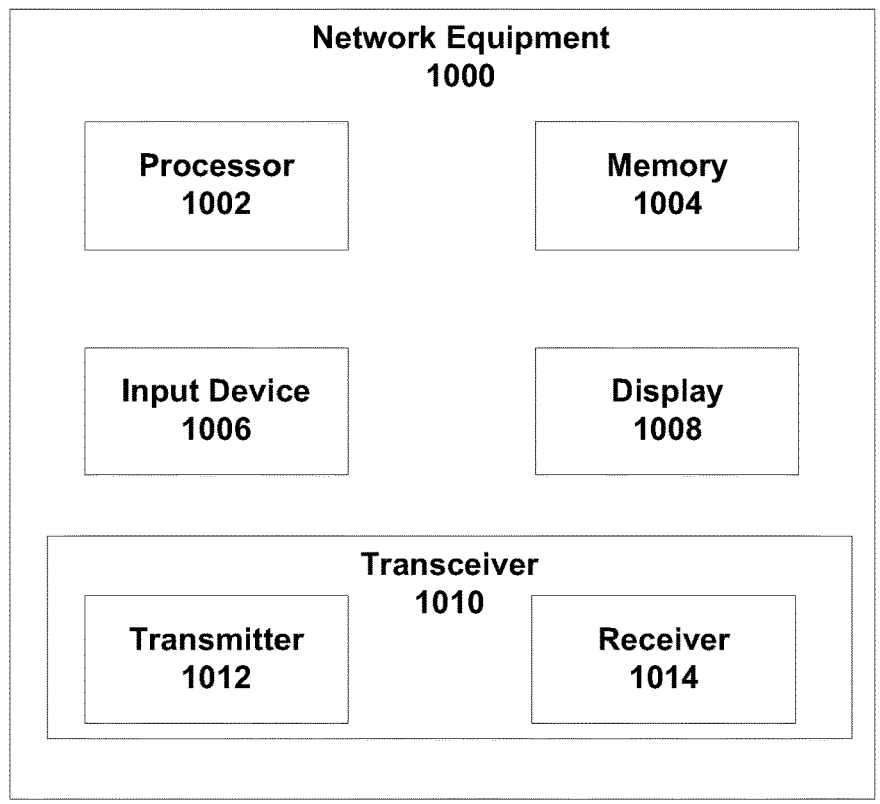
FIG. 10 is a schematic block diagram illustrating components of a network equipment according to one embodiment.

FIG. 10 is a schematic block diagram illustrating components of a network equipment according to one embodiment.

Network Equipment 1000 includes one embodiment of eNB described from FIG. 1 to FIG. 8. Furthermore, Network Equipment 1000 may include a processor 1002, a memory 1004, an input device 1006, a display 1008, and a transceiver 1010. As may be appreciated, the processor 1002, the memory 1004, the input device 1006, and the display 1008 may be substantially similar to the processor 1002, the memory 1004, the input device 1006, and the display 1008 of Mode 3/Mode 4 UE 900, respectively.

In some embodiments, the processor 1002 controls the transceiver 1010 to transmit DL signals to UE 1000. The processor 1002 may also control the transceiver 1010 to receive UL signals from UE 1000. For example, the processor 1002 may control the transceiver 1010 to receive a measurement report indicating the flight path information of UE 1000. In another example, the processor 1002 may control the transceiver 1010 to transmit a DL signals for requesting the report from UE 1000, as described above.

The transceiver 1010, in one embodiment, is configured to communicate wirelessly with UE 1000. In certain embodiments, the transceiver 1010 comprises a transmitter 1012 and a receiver 1014. The transmitter 1012 is used to transmit DL communication signals to UE 1000 and the receiver 1014 is used to receive UL communication signals from UE 1000. For example, the receivers 1014 may receive the flight path information reporting status from UE 1000. As another example, the transmitter 1012 may transmit the ground height of Network Equipment 1000.

The transceiver 1010 may communicate simultaneously with a plurality of UE 900. For example, the transmitter 1012 may transmit DL communication signals to UE 1000. As another example, the receiver 1014 may simultaneously receive UL communication signals from UE 1000. The transmitter 1012 and the receiver 1014 may be any suitable types of transmitters and receivers. Although only one transmitter 1012 and one receiver 1014 are illustrated, the transceiver 1010 may have any suitable number of transmitters 1012 and receivers 1014. For example, Network Equipment 1000 may serve multiple cells and/or cell sectors, wherein the transceiver 1010 includes a transmitter 1012 and a receiver 1014 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising a user equipment, the apparatus further comprising:
a processor; and
a transceiver that:
transmits a flight path information reporting status to a network equipment, wherein the flight path information reporting status indicates whether transmission of a report will include flight path information;
receives from the network equipment a message requesting the report, wherein the message comprises at least one condition corresponding to the report; and
transmits the report including current flight path information to the network equipment, wherein the report is determined to be transmitted based on the at least one condition.

2. The apparatus according to claim 1, wherein the flight path information includes one or more of a take-off location, a landing location, a flight path, a flight direction, intermediate locations along the flight path and planned time for arriving at the intermediate locations.

3. The apparatus according to claim 1, wherein the processor determines that the current flight path information is changed comparing with the planned flight path information, based on a difference between a current location and a planned location being larger than a first threshold within a time window, length of which is pre-configured.

4. The apparatus according to claim 1, wherein the length of the time window is 0.

5. The apparatus according to claim 3, wherein the processor calculates the difference between the current location and the planned location with an algorithm relating to a three-dimensional position.

6. The apparatus according to claim 1, wherein the processor determines that the current flight path information is changed comparing with the planned flight path information, based on a difference between an actual time and a planned time for arriving at a location being larger than a second threshold.

7. The apparatus according to claim 1, wherein the processor determines that the current flight path information is changed comparing with the planned flight path information, based on an actual flight path being different with a planned flight path.

8. The apparatus according to claim 1, wherein the transceiver receives a measurement configuration from the network equipment, which includes a condition used to determine whether the current flight path information is changed comparing with the planned flight path information.

9. The apparatus according to claim 7, wherein the condition includes one or more of the first threshold, the length of time window and the second threshold.

10. The apparatus according to claim 1, wherein:
the transceiver receives broadcast information and/or a radio resource control message from the network equipment, which indicates the network equipment's ground height; and
the processor calculates a ground height based on the network equipment's ground height.

11. The apparatus according to claim 1, wherein the transceiver receives a new radio resource control message from the network equipment for requesting the report including the flight path information, and/or a legacy radio resource control message from the network equipment which contains an information element for requesting the report including the flight path information.

12. The apparatus according to claim 11, wherein the legacy radio resource control message with the information element for requesting the flight path information reporting status includes one or more of a RRCConnectionSetup message, a RRCConnectionReconfigurationRequest message, and a RRCConnectionReestablishment message.

13. The apparatus according to claim 1, wherein the transceiver transmits the flight path information reporting status in a new radio resource control message to the network equipment, and/or in a legacy radio resource control message to the network equipment as a piggyback.

14. The apparatus according to claim 13, wherein the legacy radio resource control message with the flight path information reporting status as the piggyback includes one or more of a RRCConnectionRequest message, a RRCConnectionSetupComplete message, a RRCConnectionReconfigurationComplete message, a RRCConnectionReestablishmentRequest message, a RRCConnectionReestablishmentComplete message, a MeasurementReport message and a UEAssistanceInformation Message.

15. A method of a user equipment, the method comprising:
transmitting a flight path information reporting status to a network equipment, wherein the flight path information reporting status indicates whether transmission of a report will include flight path information;
receiving from the network equipment a message requesting the report, wherein the message comprises at least one condition corresponding to the report; and
transmitting the report including current flight path information to the network equipment, wherein the report is determined to be transmitted based on the at least one condition.

16. An apparatus comprising a network equipment, the apparatus further comprising:
a processor; and
a transceiver that:
receives a flight path information reporting status from a user equipment, wherein the flight path information reporting status indicates whether transmission of a report will include flight path information;
transmits to the user equipment a message requesting the report, wherein the message comprises at least one condition corresponding to the report; and
receives the report including current flight path information from a user equipment, wherein the report is determined to be transmitted based on the at least one condition.

17. The apparatus according to claim 16, wherein the flight path information includes one or more of a take-off location, a landing location, a flight path, a flight direction, intermediate locations along the flight path, and planned time for arriving at the intermediate locations.

18. The apparatus according to claim 16, wherein a determination of the current flight path information being changed comparing with the planned flight path information is based on a difference between a current location and a planned location being larger than a first threshold within a time window, length of which is pre-configured.

19. The apparatus according to claim 16, wherein the length of the time window is 0.

\* \* \* \* \*